US005731915A

United States Patent [19]
Noda

[11] Patent Number: 5,731,915
[45] Date of Patent: Mar. 24, 1998

[54] READOUT LENS

[75] Inventor: Takayuki Noda, Omiya, Japan

[73] Assignee: Fuji Photo Optical Co., Ltd., Omiya, Japan

[21] Appl. No.: 729,693

[22] Filed: Oct. 7, 1996

[30] Foreign Application Priority Data

Oct. 27, 1995 [JP] Japan ................ 7-303804

[51] Int. Cl.$^6$ ................ G02B 9/36; G02B 9/34; G02B 9/60
[52] U.S. Cl. ................ 359/776; 359/772; 359/773; 359/775; 359/779; 359/768
[58] Field of Search ................ 359/772, 773, 359/775, 776, 779, 768

[56] References Cited

U.S. PATENT DOCUMENTS

| 2,683,395 | 7/1954 | Klemt et al. | 359/776 |
|---|---|---|---|
| 2,683,398 | 7/1954 | Klemt et al. | 359/776 |
| 2,831,395 | 4/1958 | Klemt | 359/776 |
| 3,884,557 | 5/1975 | Nakamura | 359/775 |

FOREIGN PATENT DOCUMENTS

| 197601 | 5/1958 | Austria | 359/776 |
|---|---|---|---|
| 1-92711 | 12/1989 | Japan . | |
| 40-6250082 | 9/1994 | Japan | 359/772 |

*Primary Examiner*—David C. Nelms
*Assistant Examiner*—Evelyn A. Lester
*Attorney, Agent, or Firm*—Ronald R. Snider

[57] ABSTRACT

In a Xenotar type image-readout lens of a four-group five-element configuration, predetermined conditional expressions are satisfied so as to attain a bright lens system, while favorably correcting chromatic aberration. In a Xenotar type lens system composed of five sheets of lenses ($L_1$ to $L_5$), the second lens ($L_2$) and the third lens ($L_3$) are cemented together, a stop (i) is disposed between the third lens ($L_3$) and the fourth lens ($L_4$), and the following conditional expressions are satisfied:

$1.78 \leq N_1$, $47.0 < \upsilon_3 + \upsilon_4 < 57.0$, $1.4 < f_{123}/f < 2.0$, $22 < \upsilon_2 - \upsilon_3$, $1.37 < |f_2/f_3| < 1.64$, $1.24 < R_{42}/R_{41} < 1.37$, $33 < \upsilon_5 \times (N_5 - 1) < 41$

2 Claims, 8 Drawing Sheets

FIG. 1

READOUT LENS

RELATED APPLICATIONS

This application claims the priority of Japanese Patent Application No. 7-303804 filed on Oct. 27, 1995, which is incorporated herein by reference.

BACKGROUND OF THE INVENTION

1. Field of the Invention

The present invention relates to an imaging lens having a four-group five-element lens configuration used for reading out images in an optical system of an image readout apparatus such as facsimile machine or image scanner and, in particular, to a readout lens used as an imaging optical system with a magnification near 0.1.

2. Description of the Prior Art

For an imaging lens used for reading out an image in a facsimile machine, an image scanner, or the like which is of a type forming an image of an original image onto an image pickup device such as CCD in a reduced or enlarged state, it has been basically required to have a high resolution at the imaging magnification used, a large peripheral light quantity, and a low distortion. Additionally, together with the recent demand for attaining a compact size and a low cost in the optical apparatus as a whole, it has been required to have a compact size and a low manufacturing cost.

As an imaging lens which can respond to such requirements, there has been known a compact lens having a four-group five-element configuration disclosed in Japanese Unexamined Patent Publication No. 1-92711.

The imaging lens having a four-group five-element configuration disclosed in the above-mentioned publication has a relatively large aperture, and can attain a lower cost and a smaller size, while yielding a favorable quality in the readout image.

Recently, on the other hand, due to demands for making facsimiles and image scanners capable of handling colors, there has been an increasing necessity for reducing chromatic aberration. Thus, a readout lens which can correct chromatic aberration more favorably has been desired. Also, there has been a demand for attaining a brighter readout lens.

Since the prior art disclosed in the above-mentioned publication is concerned with monochromatic images, it has not always been sufficient in terms of correction for chromatic aberration in magnification. Also, when chromatic aberration in magnification is to be made favorable, brightness has not always been sufficient.

SUMMARY OF THE INVENTION

In view of such a circumstance, the object of the present invention is to provide a bright readout lens which can make chromatic aberration favorable, attain a small size with a low cost, and yield a favorable quality in readout images.

The readout lens in accordance with the present invention has a four-group five-element lens configuration comprising, successively from the object side, a first lens made of a positive meniscus lens having a convex surface directed onto the object side, a positive second lens, a negative third lens, a fourth lens made of a negative meniscus lens having a concave surface directed onto the object side, and a positive fifth lens, wherein the second lens and the third lens are cemented together, while the readout lens is configured to satisfy the following conditional expressions (1) to (5):

(1) $1.78 \leq N_1$
(2) $47.0 < v_3 + v_4 < 57.0$
(3) $1.4 < f_{123}/f < 2.0$
(4) $22 < v_2 - v_3$
(5) $1.37 < |f_2/f_3| < 1.64$ wherein $N_i$ is refractive index of glass material of i-th lens;
$v_i$ is Abbe number of glass material of i-th lens;
$f_{123}$ is composite focal length of the first to third lenses positioned upstream of a stop;
$f$ is focal length of the readout lens as a whole; and
$f_i$ is focal length of i-th lens.

Also, the above-mentioned readout lens may be configured so as to satisfy the following conditional expressions (6) and (7):

$$1.24 < R_{42}/R_{41} < 1.37 \qquad (6)$$

$$33 < v_5 \times (N_5 - 1) < 41$$

$N_1$ is refractive index of glass material of i-th lens;
$v_1$ is Abbe number of glass material of i-th lens;
$R_{41}$ is radius of curvature of the surface of the fourth lens on the object side; and
$R_{42}$ is radius of curvature of the surface of the fourth lens on the imaging surface side.

DETAILED DESCRIPTION OF THE PREFERRED EMBODIMENTS

Figure 1:
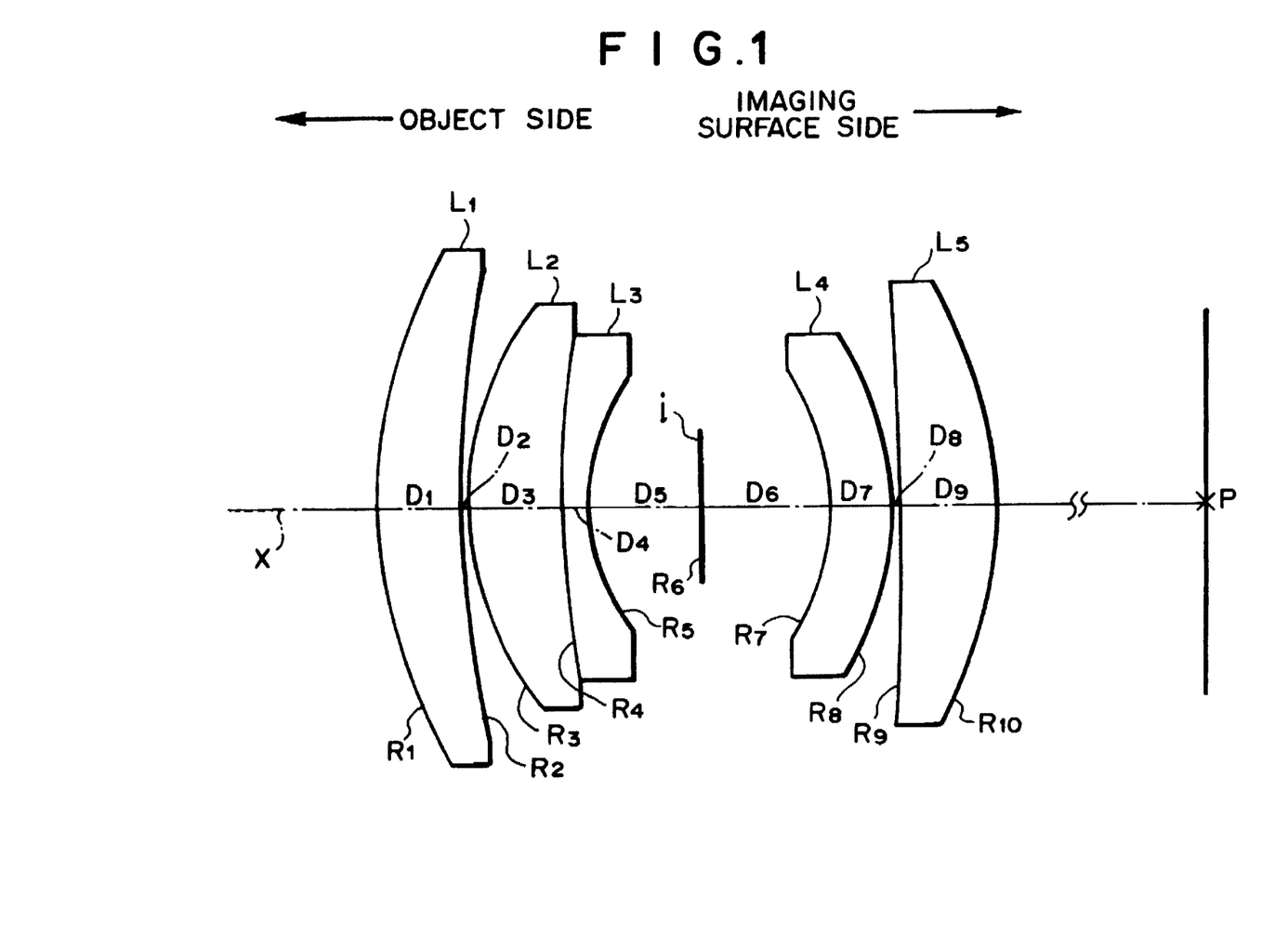
FIG. 1 is a schematic view showing a basic lens configuration in accordance with Embodiments 1 to 7 of the present invention.
Figure 2A:
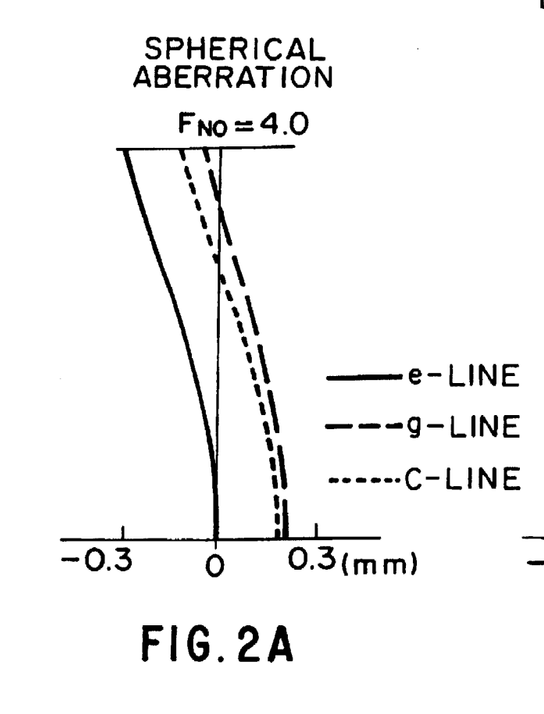
FIG. 2 is an aberration chart (for spherical aberration astigmatism, and distortion) of the lens in accordance with Embodiment 1.
Figure 2B:
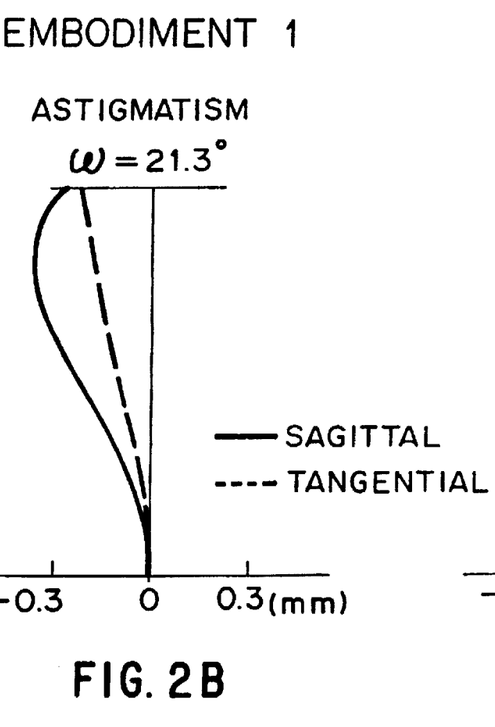
Figure 2C:
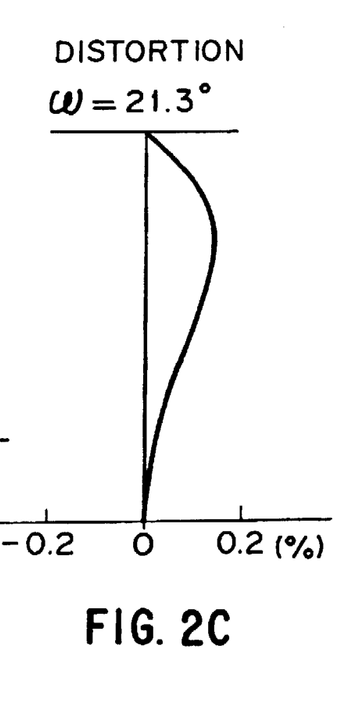
Figure 3A:
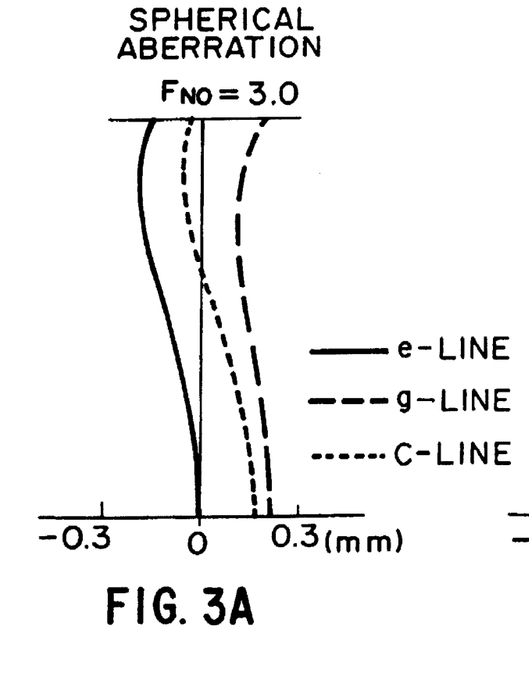
FIG. 3 is an aberration chart (for spherical aberration astigmatism, and distortion) of the lens in accordance with Embodiment 2.
Figure 3B:
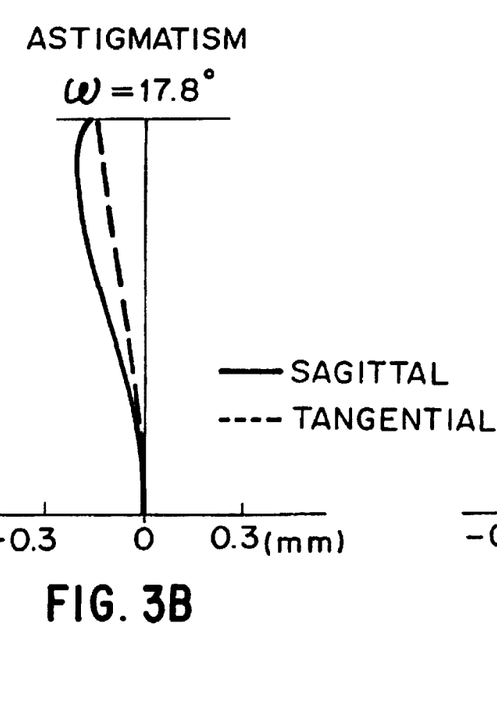
Figure 3C:
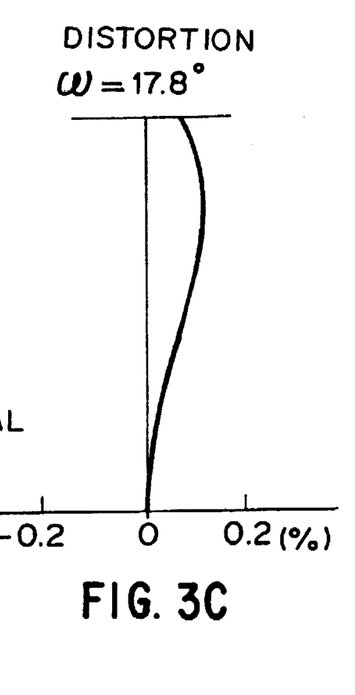
Figure 4A:
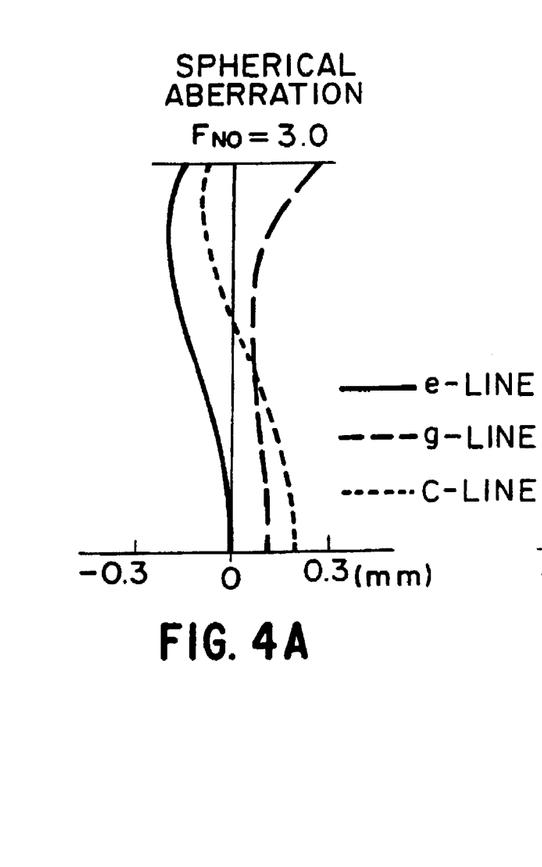
FIG. 4 is an aberration chart (for spherical aberration astigmatism, and distortion) of the lens in accordance with Embodiment 3.
Figure 4B:
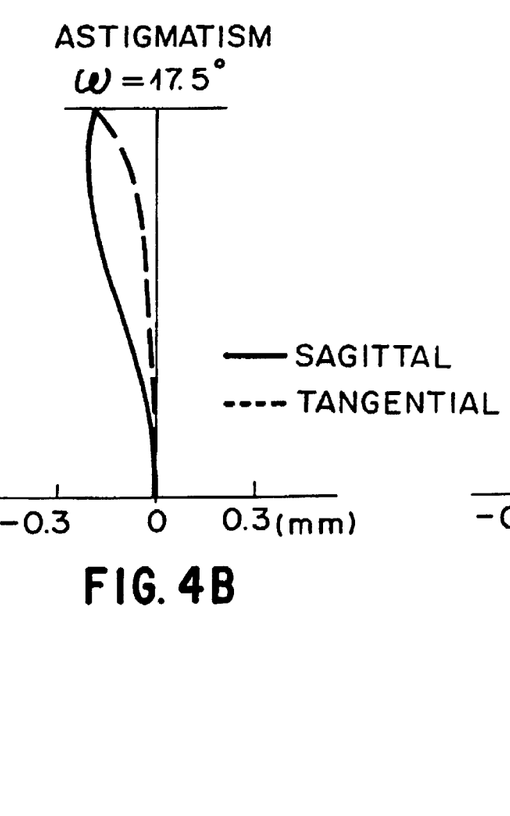
Figure 4C:
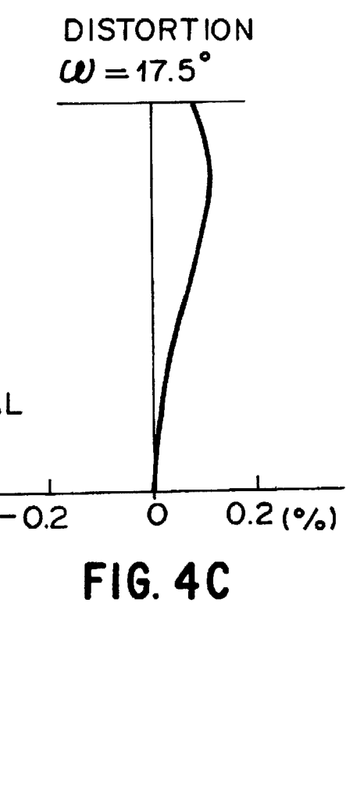
Figure 5A:
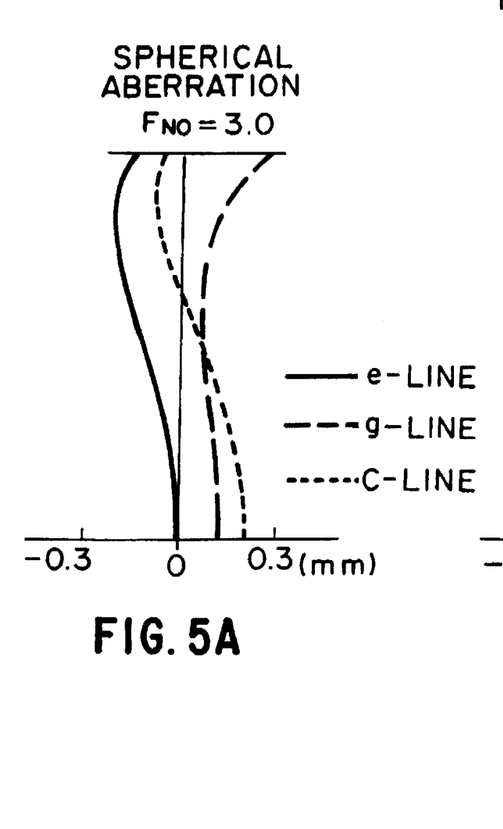
FIG. 5 is an aberration chart (for spherical aberration, astigmatism, and distortion) of the lens in accordance with Embodiment 4.
Figure 5B:
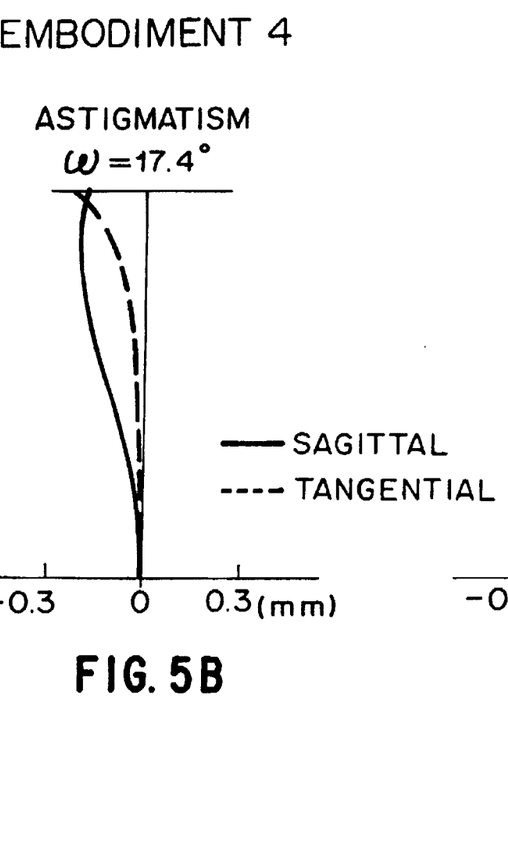
Figure 5C:
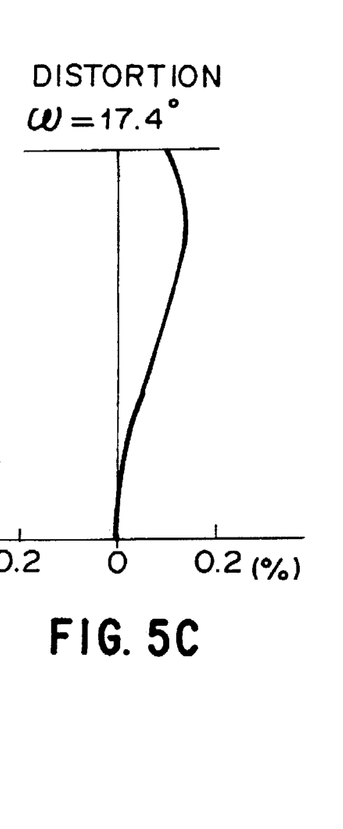
Figure 6A:
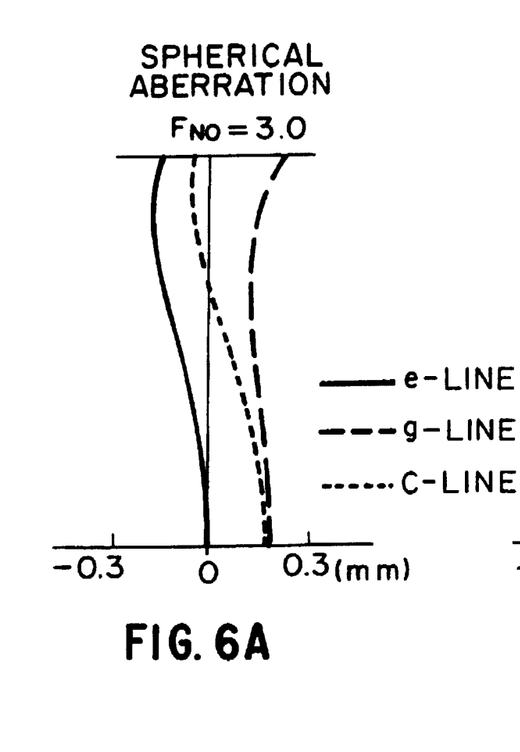
FIG. 6 is an aberration chart (for spherical aberration astigmatism, and distortion) of the lens in accordance with Embodiment 5.
Figure 6B:
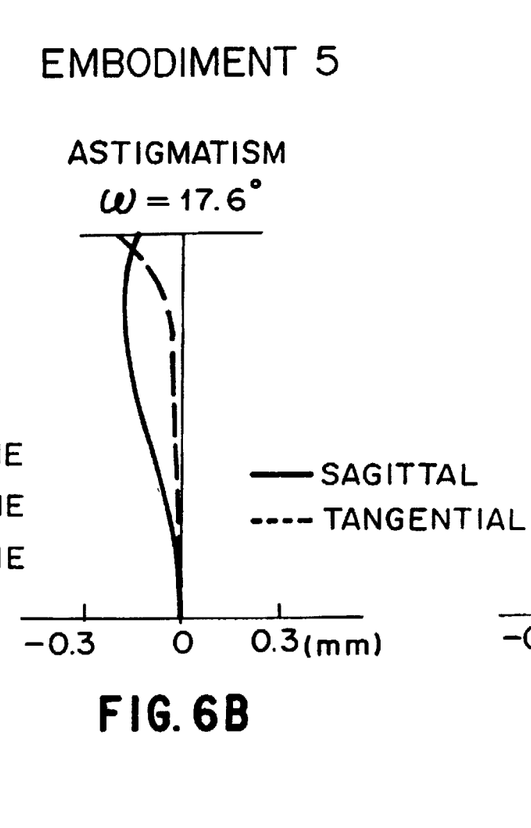
Figure 6C:
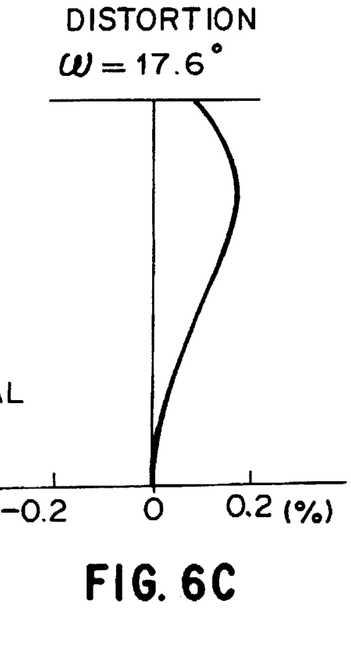
Figure 7A:
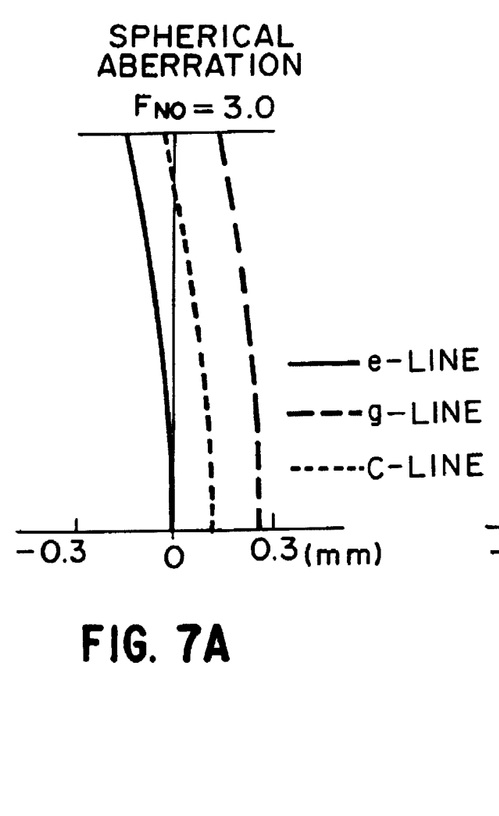
FIG. 7 is an aberration chart (for spherical aberration astigmatism, and distortion) of the lens In accordance with Embodiment 6.
Figures 7B, 7C:
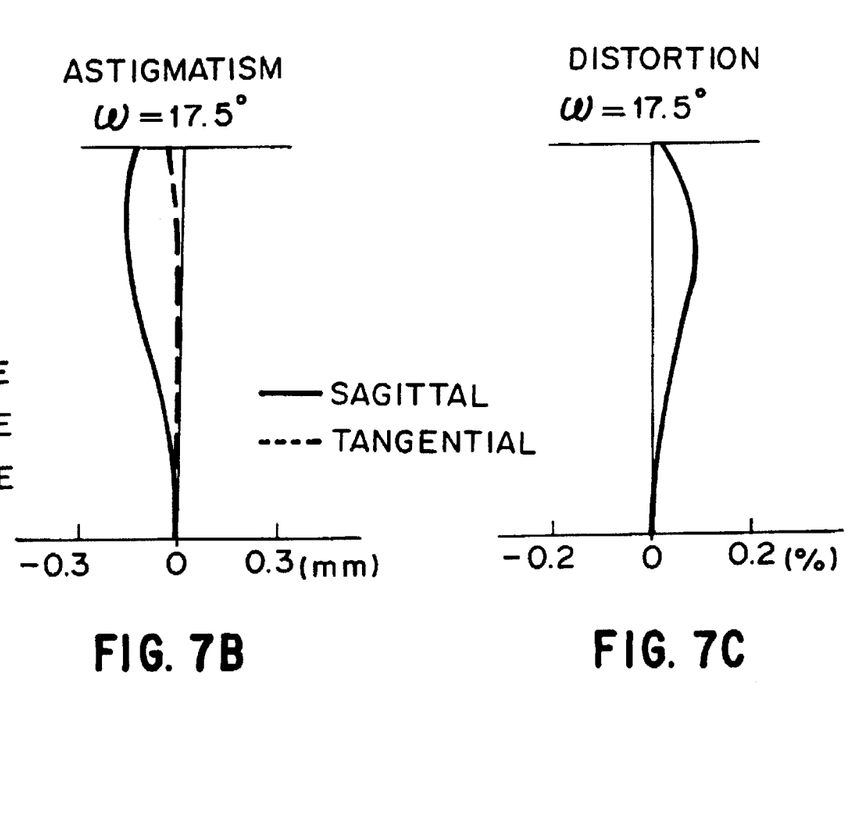
Figure 8A:
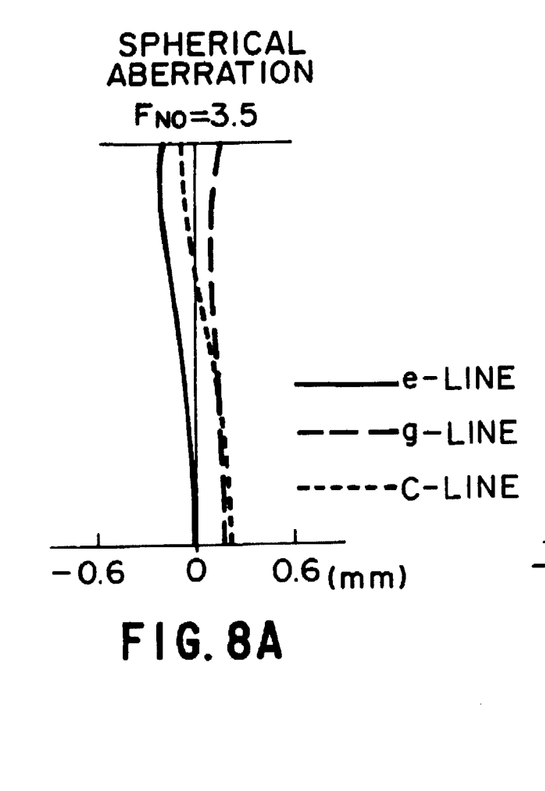
FIG. 8 is an aberration chart (for spherical aberration astigmatism, and distortion) of the lens in accordance with Embodiment 7.
Figures 8B, 8C:
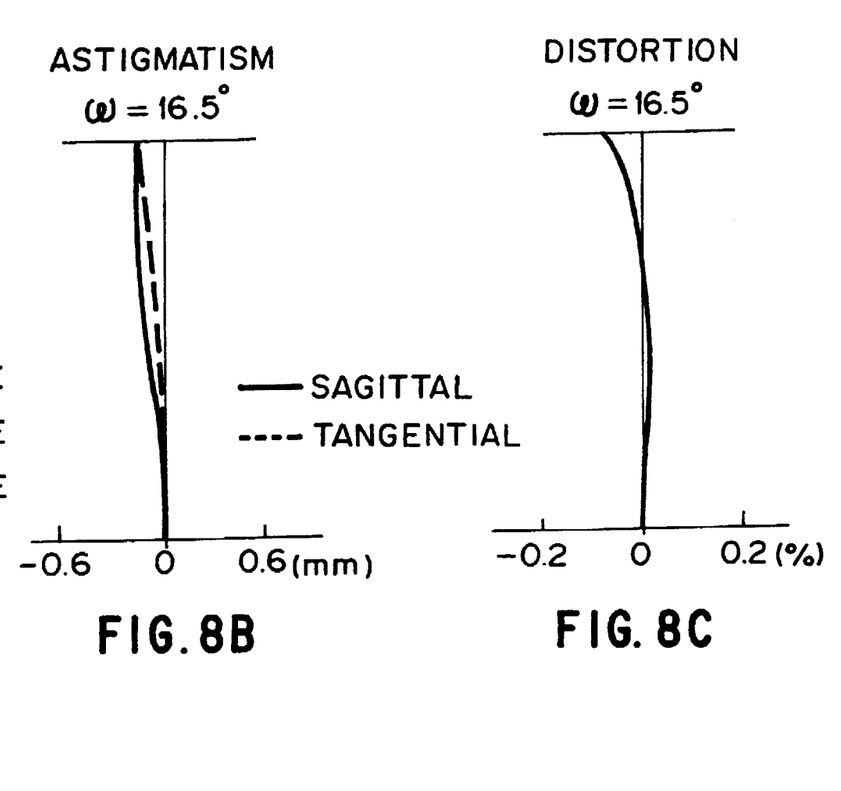

In the following, embodiments of the present invention will be explained with reference to drawings. Here, FIG. 1 shows a basic lens configuration of Embodiments 1 to 7. As shown in FIG. 1, the imaging lens (readout lens) for reading out images in accordance with these embodiments is a Xenotar type lens system having a four-group five-element configuration constituted by five sheets of lenses $L_1$ to $L_5$, in which the second and third lenses are cemented together, while a stop i is disposed between the third lens $L_3$ and the fourth lens $L_4$, whereby a luminous flux incident on the readout lens from the object side along an optical axis X forms an image at an imaging position P.

Here, each of the first lens $L_1$ and second lens $L_2$ is a positive meniscus lens having a convex surface directed onto the object side (except for Embodiment 3 in which the second lens $L_2$ is a biconvex lens having a surface with a strong curvature directed onto the object side); the third lens $L_3$ is a negative meniscus lens having a convex surface directed onto the object side (except for Embodiment 3 in which the third lens $L_3$ is a biconcave lens having a surface with a stronger curvature directed onto the imaging surface side); the fourth lens $L_4$ is a negative meniscus lens having a concave surface directed onto the object side; and the fifth lens $L_5$ is a positive meniscus lens having a concave surface directed onto the object side (except for Embodiment 5 in which the fifth lens $L_5$ is a biconvex lens having a surface with a stronger curvature directed onto the imaging surface side).

Also, each of the readout lenses in accordance with the respective embodiments satisfies the following conditional expressions:

(1) $1.78 \leq N_1$
(2) $47.0 < \nu_3 + \nu_4 < 57.0$
(3) $1.4 < f_{123}/f < 2.0$
(4) $22 < \nu_2 - \nu_3$
(5) $1.37 < |f_2/f_3| < 1.64$
(6) $1.24 < R_{42}/R_{41} < 1.37$
(7) $33 < \nu_5 \times (N_5 - 1) < 41$ wherein $N_i$ is refractive index of glass material of i-th lens;

$\nu_i$ is Abbe number of glass material of i-th lens;

$f_{123}$ a is composite focal length of the first to third lenses positioned upstream of the stop;

f is focal length of the readout lens as a whole;

$f_i$ is focal length of i-th lens;

$R_{41}$ is radius of curvature of the surface of the fourth lens on the object side; and $R_{42}$ is radius of curvature of the surface of the fourth lens on the imaging surface side.

In the following, technical significance of the above-mentioned conditional expressions (1) to (7) will be explained.

The above-mentioned conditional expression (1) is a conditional expression defining the refractive index $N_1$ of glass material of the first lens, and designates a range within which spherical aberration and astigmatism can be favorably corrected.

Accordingly, spherical aberration and astigmatism are made favorable when this conditional expression (1) is satisfied.

The above-mentioned conditional expression (2) is a conditional expression defining the sum of the Abbe number $\nu_3$ of the third lens $L_3$ and the Abbe number $\nu_4$ of the fourth lens $L_4$. Beyond the upper limit of this range, both spherical aberration and axial chromatic aberration are corrected insufficiently. Below the lower limit, by contrast, spherical aberration is corrected insufficiently, whereas axial chromatic aberration is corrected too much.

Accordingly, both spherical aberration and axial chromatic aberration can be made favorable when this conditional expression (2) is satisfied.

The above-mentioned conditional expression (3) defines the ratio of the composite focal length $f_{123}$ of the first to third lenses $L_1$ to $L_3$ disposed upstream of the stop i to the composite focal length f of the whole lens system. Beyond the upper limit of this range, distortion becomes greater. Below the lower limit of this range, by contrast, since the third lens $L_3$ is a lens system having a negative refractive power, the fourth lens $L_4$ must carry a heavier load of power, thereby making it difficult to correct various kinds of aberration.

Accordingly, when this conditional expression (3) is satisfied, distortion and other kinds of aberration can be made favorable.

The above-mentioned conditional expression (4) defines the difference in Abbe number $\nu_2 - \nu_3$ between the second lens $L_2$ and the third lens $L_3$, such that this difference becomes greater. Namely, while this cemented lens system as a whole has a negative refractive power, as the concave third lens $L_3$ is made of a material having an Abbe number smaller than that of the convex second lens $L_2$, strong dispersion force of the third lens $L_3$ can yield achromatism.

The above-mentioned conditional expression (5) defines the absolute value of the ratio of the focal length $f_2$ of the second lens $L_2$ to the focal length $f_3$ of the third lens $L_3$. Beyond the upper limit of this range, chromatic aberration is corrected too much; whereas, below the lower limit, chromatic aberration is corrected insufficiently.

Accordingly, chromatic aberration can be favorably corrected when this conditional expression (5) is satisfied.

The above-mentioned conditional expression (6) defines the ratio of the radius of curvature of the surface of the fourth lens $L_4$ on the imaging surface side to that of the surface of the same lens $L_4$ on the object side. Beyond the upper limit of the range, the absolute value of the ratio $|f_4/f|$ of the focal length $f_4$ of the fourth lens $L_4$ to the focal length f of the whole lens system is made greater, thereby increasing chromatic aberration. Below the lower limit, by contrast, distortion is corrected too much.

Accordingly, chromatic aberration and distortion can be made favorable when this conditional expression (6) is satisfied.

The above-conditional expression (7) defines the value of product of the Abbe number $\nu_5$ of the fifth lens $L_5$ and $(N_5-1)$ which is obtained when 1 is subtracted from the refractive index of the fifth lens $L_5$. Beyond the upper limit, spherical aberration is corrected insufficiently; whereas, below the lower limit, spherical aberration is corrected too much.

Accordingly, spherical aberration can be made favorable when this conditional expression (7) is satisfied.

In the following, each of Embodiments 1 to 7 will be explained with reference to their specific values.

Embodiment 1

Table 1 (follows) shows radius of curvature R (mm) of each lens surface, center thickness of each lens and air gap between neighboring lenses D (mm), and refractive index N and Abbe number $\nu$ of each lens at e-line in Embodiment 1.

Here, in Table 1 as well as in Tables 2 to 7 which will be shown later, the reference numbers corresponding to each of the marks R, D, N, and $\nu$ successively increase from the object side.

Also, the lower portion of Table 1 shows values of the focal length f, F number, half field angle $\omega$, and imaging magnification $\beta$ of the whole lens system in the readout lens of this embodiment.

Further, Table 8 (follows) shows values in this embodiment respectively corresponding to the above-mentioned conditional expressions (1) to (7).

As can be seen from Table 8, each of conditional expressions (1) to (7) is satisfied in this embodiment, and chromatic aberration is sufficiently corrected. Also, brightness ($F_{No}$=4.0) is made sufficient for a readout lens.

Embodiment 2

Table 2 (follows) shows radius of curvature R (mm) of each lens surface, center thickness of each lens and air gap between neighboring lenses D (mm), and refractive index N and Abbe number υ of each lens at e-line in Embodiment 2.

Also, the lower portion of Table 2 shows values of the focal length f, F number, half field angle ω, and imaging magnification β of the whole lens system in the readout lens of this embodiment.

Further, Table 8 shows values in this embodiment respectively corresponding to the above-mentioned conditional expressions (1) to (7).

As can be seen from Table 8, each of conditional expressions (1) to (7) is satisfied in this embodiment, and chromatic aberration is sufficiently corrected. Also, brightness ($F_{No}$=3.0) is made sufficient for a readout lens.

Embodiment 3

Table 3 (follows) shows radius of curvature R (mm) of each lens surface, center thickness of each lens and air gap between neighboring lenses D (mm), and refractive index N and Abbe number υ of each lens at e-line in Embodiment 3.

Also, the lower portion of Table 3 shows values of the focal length f, F number, half field angle ω, and imaging magnification β of the whole lens system in the readout lens of this embodiment.

Further, Table 8 shows values in this embodiment respectively corresponding to the above-mentioned conditional expressions (1) to (7).

As can be seen from Table 8, each of conditional expressions (1) to (7) is satisfied in this embodiment, and chromatic aberration is sufficiently corrected. Also, brightness ($F_{No}$=3.0) is made sufficient for a readout lens.

Embodiment 4

Table 4 (follows) shows radius of curvature R (mm) of each lens surface, center thickness of each lens and air gap between neighboring lenses D (mm), and refractive index N and Abbe number υ of each lens at e-line in Embodiment 4.

Also, the lower portion of Table 4 shows values of the focal length f, F number, half field angle ω, and imaging magnification β of the whole lens system in the readout lens of this embodiment.

Further, Table 8 shows values in this embodiment respectively corresponding to the above-mentioned conditional expressions (1) to (7).

As can be seen from Table 8, each of conditional expressions (1) to (7) is satisfied in this embodiment, and chromatic aberration is sufficiently corrected. Also, brightness ($F_{No}$=3.0) is made sufficient for a readout lens.

Embodiment 5

Table 5 (follows) shows radius of curvature R (mm) of each lens surface, center thickness of each lens and air gap between neighboring lenses D (mm), and refractive index N and Abbe number υ of each lens at e-line in Embodiment 5.

Also, the lower portion of Table 5 shows values of the focal length f, F number, half field angle ω, and imaging magnification β of the whole lens system in the readout lens of this embodiment.

Further, Table 8 shows values in this embodiment respectively corresponding to the above-mentioned conditional expressions (1) to (7).

As can be seen from Table 8, each of conditional expressions (1) to (7) is satisfied in this embodiment, and chromatic aberration is sufficiently corrected. Also, brightness ($F_{No}$=3.0) is made sufficient for a readout lens.

Embodiment 6

Table 6 (follows) shows radius of curvature R (mm) of each lens surface, center thickness of each lens and air gap between neighboring lenses D (mm), and refractive index N and Abbe number υ of each lens at e-line in Embodiment 6.

Also, the lower portion of Table 6 shows values of the focal length f, F number, half field angle ω, and imaging magnification β of the whole lens system in the readout lens of this embodiment.

Further, Table 8 shows values in this embodiment respectively corresponding to the above-mentioned conditional expressions (1) to (7).

As can be seen from Table 8, each of conditional expressions (1) to (7) is satisfied in this embodiment, and chromatic aberration is sufficiently corrected. Also, brightness ($F_{No}$=3.0) is made sufficient for a readout lens.

Embodiment 7

Table 7 (follows) shows radius of curvature R (mm) of each lens surface, center thickness of each lens and air gap between neighboring lenses D (mm), and refractive index N and Abbe number υ of each lens at e-line in Embodiment 7.

Also, the lower portion of Table 7 shows values of the focal length f, F number, half field angle ω, and imaging magnification β of the whole lens system in the readout lens of this embodiment.

Further, Table 8 shows values in this embodiment respectively corresponding to the above-mentioned conditional expressions (1) to (7).

As can be seen from Table 8, each of conditional expressions (1) to (7) is satisfied in this embodiment, and chromatic aberration is sufficiently corrected. Also, brightness ($F_{No}$=3.5) is made sufficient for a readout lens.

FIGS. 2 to 8 are aberration charts (aberration charts for spherical aberration, astigmatism, and distortion) respectively corresponding to Embodiments 1 to 7. In these charts, ω indicates the half field angle.

Also, each spherical aberration chart shows respective aberrations with respect to e-line, g-line, and C-line. Also, each astigmatism chart shows respective aberrations with respect to the sagittal (S) image surface and the tangential (T) image surface.

As can be seen from FIGS. 2 to 8, all the above-mentioned various kinds of aberration can be made favorable in the above-mentioned embodiments.

Without being restricted to the foregoing embodiments, the readout lens of the present invention can be modified in various manners. For example, the radius of curvature R and lens spacing (or lens thickness) D can be appropriately changed.

As explained in the foregoing, in the readout lens of the present invention, since the whole system is configured in a four-group five-element Xenotar type, while satisfying the above-mentioned predetermined conditional expressions;

the lens system can be made compact with a low cost, while favorably correcting various kinds of aberration such as chromatic aberration in particular. Also, this readout lens can be made as a bright lens system.

TABLE 1

| Surface No. | R | D | N | ν |
|---|---|---|---|---|
| 1 | 50.666 | 8.71 | 1.81184 | 33.3 |
| 2 | 114.357 | 0.51 | | |
| 3 | 31.838 | 9.89 | 1.77621 | 49.6 |
| 4 | 97.729 | 2.69 | 1.81263 | 25.4 |
| 5 | 21.727 | 11.47 | | |
| 6 | ∞ (Stop) | 13.65 | | |
| 7 | −24.662 | 6.15 | 1.79180 | 26.0 |
| 8 | −32.780 | 0.54 | | |
| 9 | −833.926 | 9.73 | 1.62286 | 60.3 |
| 10 | −45.946 | | | |
| Focal length of whole system f | | 100 mm | | |
| F No. | | 4.0 | | |
| Half field angle ω | | 21.3° | | |
| Magnification β | | −0.112 | | |

TABLE 2

| Surface No. | R | D | N | ν |
|---|---|---|---|---|
| 1 | 58.003 | 7.76 | 1.81184 | 33.3 |
| 2 | 139.026 | 0.52 | | |
| 3 | 32.966 | 12.94 | 1.77621 | 49.6 |
| 4 | 180.898 | 2.53 | 1.79176 | 26.2 |
| 5 | 22.082 | 13.02 | | |
| 6 | ∞ (Stop) | 13.91 | | |
| 7 | −23.720 | 4.51 | 1.92772 | 21.4 |
| 8 | −30.354 | 0.42 | | |
| 9 | −519.238 | 13.24 | 1.71616 | 53.9 |
| 10 | −48.226 | | | |
| Focal length of whole system f | | 100 mm | | |
| F No. | | 3.0 | | |
| Half field angle ω | | 17.8° | | |
| Magnification β | | −0.110 | | |

TABLE 3

| Surface No. | R | D | N | ν |
|---|---|---|---|---|
| 1 | 89.070 | 10.44 | 1.81264 | 25.4 |
| 2 | 269.737 | 4.89 | | |
| 3 | 31.335 | 11.52 | 1.77621 | 49.6 |
| 4 | −1813.069 | 3.98 | 1.79176 | 26.2 |
| 5 | 23.095 | 6.17 | | |
| 6 | ∞ (Stop) | 20.62 | | |
| 7 | −21.731 | 5.29 | 1.79176 | 26.2 |
| 8 | −28.508 | 0.31 | | |
| 9 | −629.843 | 10.82 | 1.71616 | 53.9 |
| 10 | −47.951 | | | |
| Focal length of whole system f | | 100 mm | | |
| F No. | | 3.0 | | |
| Half field angle ω | | 17.5° | | |
| Magnification β | | −0.110 | | |

TABLE 4

| Surface No. | R | D | N | ν |
|---|---|---|---|---|
| 1 | 88.286 | 13.82 | 1.81264 | 25.4 |
| 2 | 259.563 | 0.51 | | |
| 3 | 31.632 | 13.17 | 1.77621 | 49.6 |
| 4 | 1929.338 | 3.06 | 1.79191 | 25.7 |
| 5 | 22.986 | 6.12 | | |
| 6 | ∞ (Stop) | 20.44 | | |

TABLE 4-continued

| Surface No. | R | D | N | ν |
|---|---|---|---|---|
| 7 | −21.569 | 4.65 | 1.79176 | 26.2 |
| 8 | −27.938 | 1.78 | | |
| 9 | −563.820 | 9.87 | 1.71616 | 53.9 |
| 10 | −47.334 | | | |
| Focal length of whole system f | | 100 mm | | |
| F No. | | 3.0 | | |
| Half field angle ω | | 17.4° | | |
| Magnification β | | −0.110 | | |

TABLE 5

| Surface No. | R | D | N | ν |
|---|---|---|---|---|
| 1 | 75.094 | 6.45 | 1.81184 | 33.3 |
| 2 | 220.786 | 0.52 | | |
| 3 | 33.954 | 14.52 | 1.77621 | 49.6 |
| 4 | 296.404 | 4.57 | 1.79176 | 26.2 |
| 5 | 23.014 | 6.22 | | |
| 6 | ∞ (Stop) | 20.78 | | |
| 7 | −22.900 | 3.90 | 1.92772 | 21.4 |
| 8 | −28.667 | 4.35 | | |
| 9 | 6061.971 | 10.45 | 1.71616 | 53.9 |
| 10 | −53.020 | | | |
| Focal length of whole system f | | 100 mm | | |
| F No. | | 3.0 | | |
| Half field angle ω | | 17.6° | | |
| Magnification β | | −0.110 | | |

TABLE 6

| Surface No. | R | D | N | ν |
|---|---|---|---|---|
| 1 | 47.411 | 7.62 | 1.80645 | 46.7 |
| 2 | 97.436 | 0.95 | | |
| 3 | 29.028 | 9.36 | 1.71616 | 53.9 |
| 4 | 104.740 | 2.43 | 1.69416 | 31.1 |
| 5 | 19.622 | 10.12 | | |
| 6 | ∞ (Stop) | 15.05 | | |
| 7 | −24.211 | 8.22 | 1.79191 | 25.7 |
| 8 | −32.835 | 0.40 | | |
| 9 | 625.375 | 8.95 | 1.49845 | 81.6 |
| 10 | −46.269 | | | |
| Focal length of whole system f | | 100 mm | | |
| F No. | | 3.0 | | |
| Half field angle ω | | 17.5° | | |
| Magnification β | | −0.110 | | |

TABLE 7

| Surface No. | R | D | N | ν |
|---|---|---|---|---|
| 1 | 76.786 | 6.48 | 1.81264 | 25.4 |
| 2 | 193.797 | 3.23 | | |
| 3 | 32.444 | 13.14 | 1.77621 | 49.6 |
| 4 | 1700.735 | 2.51 | 1.79176 | 26.2 |
| 5 | 22.620 | 8.74 | | |
| 6 | ∞ (Stop) | 16.43 | | |
| 7 | −21.789 | 4.58 | 1.79176 | 26.2 |
| 8 | −28.632 | 0.50 | | |
| 9 | −242.286 | 8.86 | 1.71616 | 53.9 |
| 10 | −40.985 | | | |
| Focal length of whole system f | | 100 mm | | |
| F No. | | 3.5 | | |
| Half field angle ω | | 16.5° | | |
| Magnification β | | −0.110 | | |

TABLE 8

| Expression | Value in expression | Embodiment 1 | Embodiment 2 | Embodiment 3 | Embodiment 4 |
|---|---|---|---|---|---|
| (1) $1.78 \leq N_1$ | $N_1$ | 1.812 | 1.812 | 1.813 | 1.813 |
| (2) $47.0 < v_3 + v_4 < 57.0$ | $v_3 + v_4$ | 51.4 | 47.6 | 52.4 | 51.9 |
| (3) $1.4 < f_{123}/f < 2.0$ | $f_{123}/f$ | 1.61 | 1.52 | 1.62 | 1.60 |
| (4) $22 < v_2 - v_3$ | $v_2 - v_3$ | 24.2 | 23.4 | 24.1 | 23.9 |
| (5) $1.37 < |f_2/f_3| < 1.64$ | $f_2/f_3$ | −1.63 | −1.56 | −1.38 | −1.41 |
| (6) $1.24 < R_{42}/R_{41} < 1.37$ | $R_{42}/R_{41}$ | 1.33 | 1.28 | 1.31 | 1.30 |
| (7) $33 < v_5 \times (N_5 - 1) < 41$ | $v_5 \times (N_5 - 1)$ | 37.6 | 38.6 | 38.6 | 38.6 |

| Expression | Value in expression | Embodiment 5 | Embodiment 6 | Embodiment 7 |
|---|---|---|---|---|
| (1) $1.78 \leq N_1$ | $N_1$ | 1.812 | 1.806 | 1.813 |
| (2) $47.0 < v_3 + v_4 < 57.0$ | $v_3 + v_4$ | 47.6 | 56.8 | 52.4 |
| (3) $1.4 < f_{123}/f < 2.0$ | $f_{123}/f$ | 1.42 | 1.41 | 1.97 |
| (4) $22 < v_2 - v_3$ | $v_2 - v_3$ | 23.4 | 22.8 | 23.4 |
| (5) $1.37 < |f_2/f_3| < 1.64$ | $f_2/f_3$ | −1.52 | −1.52 | −1.47 |
| (6) $1.24 < R_{42}/R_{41} < 1.37$ | $R_{42}/R_{41}$ | 1.25 | 1.36 | 1.31 |
| (7) $33 < v_5 \times (N_5 - 1) < 41$ | $v_5 \times (N_5 - 1)$ | 38.6 | 40.7 | 38.6 |

What is claimed is:

1. A readout lens having a four-group, five-element lens configuration comprising, successively from an object side, a first lens made of a positive meniscus lens having a convex surface directed onto the object side, a positive second lens, a negative third lens, a fourth lens made of a negative meniscus lens having a concave surface directed onto the object side, and a positive fifth lens, said second lens and said third lens being cemented together, wherein said readout lens is configured to satisfy the following conditional expressions (1) to (5):

| |
|---|
| (1) $1.78 \leq N_1$ |
| (2) $47.0 < v_3 + v_4 < 57.0$ |
| (3) $1.4 < f_{123}/f < 2.0$ |
| (4) $22 < v_2 - v_3$ |
| (5) $1.40 < |f_2/f_3| < 1.64$ | wherein $N_i$ is refractive index of glass material of i-th lens;

$v_i$ is Abbe number of glass material of i-th lens;

$f_{123}$ is composite focal length of the first to third lenses positioned upstream of a stop;

f is focal length of the readout lens as a whole; and $f_i$ is focal length of i-th lens.

2. A readout lens according to claim 1, wherein said readout lens is configured so as to satisfy the following conditional expressions (6) and (7):

$$1.24 < R_{42}/R_{41} < 1.36 \quad (6)$$

$$33 < v_5 \times (N_5 - 1) < 41 \quad (7)$$

wherein $N_i$ is refractive index of glass material of i-th lens;

$v_i$ is Abbe number of glass material of i-th lens;

$R_{41}$ is radius of curvature of the surface of the fourth lens of the object side; and $R_{42}$ is radius of curvature of the surface of the fourth lens on an imaging surface side.

* * * * *